United States Patent
Lee (10) Patent No.: US 8,832,834 B2
(45) Date of Patent: Sep. 9, 2014

(54) WEBSHELL DETECTION AND RESPONSE SYSTEM

(71) Applicant: Jae-Woo Lee, Seoul (KR)

(72) Inventor: Jae-Woo Lee, Seoul (KR)

(73) Assignee: Infosec Co., Ltd., Seoul (KR)

( * ) Notice: Subject to any disclaimer, the term of this patent is extended or adjusted under 35 U.S.C. 154(b) by 0 days.

(21) Appl. No.: 13/845,360

(22) Filed: Mar. 18, 2013

(65) Prior Publication Data

US 2014/0215619 A1 Jul. 31, 2014

(30) Foreign Application Priority Data

Jan. 28, 2013 (KR) .................. 10-2013-0009330

(51) Int. Cl.
*G06F 21/00* (2013.01)
*H04L 29/06* (2006.01)

(52) U.S. Cl.
CPC .................. *H04L 63/1483* (2013.01)
USPC ............................................ 726/23; 726/22

(58) Field of Classification Search
USPC ...................................................... 726/22–23
See application file for complete search history.

(56) References Cited

U.S. PATENT DOCUMENTS 8,079,080 B2 * 12/2011 Borders .......................... 726/22

FOREIGN PATENT DOCUMENTS

| JP | 2009-169490 | | 7/2009 |
|---|---|---|---|
| KR | 10-2009-0088687 | | 8/1998 |
| KR | 1020110045209 | * | 5/2011 |
| KR | 10-1080953 | | 11/2011 |
| KR | 10-2013-0008119 | | 1/2013 |

* cited by examiner

*Primary Examiner* — Ghazal Shehni
(74) *Attorney, Agent, or Firm* — NSIP Law (57) ABSTRACT

A webshell detection and response system is provided. The webshell detection and response system may collect information from a detection target server through an information collection script inserted into a webpage home path of the detection target server without installing a separate web shell detection application compiled in the form of binary file in the detection target server, and determine whether the detection target server is infected with a webshell remotely using the collected information.

10 Claims, 4 Drawing Sheets

WEBSHELL DETECTION AND RESPONSE SYSTEM

CROSS-REFERENCE TO RELATED APPLICATION

This application claims the benefit under 35 U.S.C. §119(a) of a Korean Patent Application No. 10-2013-0009330, filed on Jan. 28, 2013, the entire disclosure of which is incorporated herein by reference for all purposes.

BACKGROUND

1. Field

The following description relates to a webshell detection technology, and more particularly, to a webshell detection/response system which may easily detect a webshell of a detection target server without installing a separate webshell detection application that is compiled in the form of a binary file in the detection target server.

2. Description of the Related Art

A webshell refers to web script files such as asp, php, jsp, and cgi files which are created so that an attacker enables an intrusion target server to execute a command remotely. The attacker may acquire an administrator authority of the intrusion target server using the webshell and then perform a variety of attacks such as reading of a webpage source of the intrusion target server, data leakage of contents or the like within the intrusion target server, installation of a backdoor program, and the like.

In recent years, types of the attacks have been increasingly skillful, such as constantly hacking the intrusion target server after attacking web vulnerability, such as SQL injection and file uploading.

Korean Patent Publication No. 10-2009-0088687 (Aug. 20, 2009) relates to webshell detection technology that is installed in a detection target computer to detect whether the detection target computer is infected with a webshell through webshell signature analysis and enables a server to update a webshell signature when an unregistered webshell signature is generated.

However, this conventional webshell detection technology detects a webshell through the installation of a separate webshell detection application compiled in the form of a binary file in a detection target server, and therefore there were problems that the webshell detection application was likely to conflict with other applications being processed in the detection target server, separate administration personnel for webshell detection was required, and there was difficulty in coping rapidly with occurrence of an accident due to the absence of expert knowledge when the accident by the webshell occurred.

Therefore, by the inventor of the present application, research on a webshell detection technology that can easily detect a webshell of a detection target server even without installing a separate webshell detection application compiled in the form of binary file in the detection target server has been conducted.

PRIOR ART LITERATURE

Patent Literature (Patent Document 1) Korean Patent Publication No. 10-2009-0088687 (Aug. 20, 2009)

SUMMARY

One objective of the present invention is to provide a webshell detection and response system that may collect information from a detection target server through an information collection script inserted into a webpage home path of the detection target server without installing a separate web shell detection application complied in the form of binary file in the detection target server, and may determine from the remote site whether the detection target server is infected with a webshell using the collected information.

In one general aspect, a webshell detection and response system includes: a script interlocking unit that processes interlocking with an information collection script that is inserted into a webpage home path of a detection target server to collect information from the detection target server; a database (DB) management unit that stores, in a DB, integrity hash information of each of webpage constituent contents of the detection target server in advance and manages the stored hash information; and an information analysis unit that compares current hash information of each of the webpage constituent contents of the detection target server periodically or non-periodically collected by the information collection script interlocked by the script interlocking unit and the integrity hash information of each of the webpage constituent contents of the detection target server that is stored by the DB management unit to thereby retrieve a modulated webpage constituent content.

Here, the information analysis unit may request transmission of a modulated webpage constituent content file from the information collection script and receive the modulated webpage constituent content file from the detection target server.

In addition, the information analysis unit may perform a webshell signature pattern analysis with respect to the modulated webpage constituent content file received from the detection target server to thereby detect whether the detection target server is infected with a webshell.

In addition, the webshell detection and response system may further include a response management unit that issues a warning to an administrator of the detection target server when the detection target server is determined to be infected with the webshell by the information analysis unit.

In addition, the response management unit may request update of the integrity hash information of the webpage constituent contents when the detection target server is determined not to be infected with the webshell by the information analysis unit.

In addition, the DB management unit may store the current hash information of the modulated webpage constituent contents as the integrity hash information of the corresponding webpage constituent contents in the DB in response to the update request of the integrity hash information of the webpage constituent contents from the response management unit to thereby update the integrity hash information of the webpage constituent contents.

In addition, the script interlocking unit may inspect an active or inactive state of the detection target server and request retrieval of the modulated webpage constituent content from the information analysis unit when the corresponding detection target server is in the active state.

In addition, the script interlocking unit may store a connection failure log in the corresponding detection target server when the detection target server is in the inactive state.

In addition, the hash information may include detection target server identification (ID) information, a hash value of the webpage constituent content file, a depth of a path in which the webpage constituent content file is stored, a webpage constituent content file name, a path name in which the webpage constituent content file is stored, an execution authority of the webpage constituent content file, the latest update date of the webpage constituent content file, a registration date of the webpage constituent content file, and the like.

In addition, the information collection script may include: a device interlocking unit that is interlocked with the webshell detection and response system; a hash information processing unit that generates the current hash information about all of the webpage constituent content files within the webpage home path of the detection target server and transmits the generated current hash information to the webshell detection and response system interlocked by the device interlocking unit; and a file processing unit that transmits the modulated webpage constituent content file within the webpage home path of the detection target server to the webshell detection and response system in response to the transmission request of the modulated webpage constituent content file from the webshell detection and response system interlocked by the device interlocking unit.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

The terms used throughout the present specification are terms defined by considering functions in embodiments of the present invention, and may be changeable in accordance with intention, custom, and the like of an operator, and therefore definition of these terms should be made on the basis of the contents over this entire specification.

Figure 1:
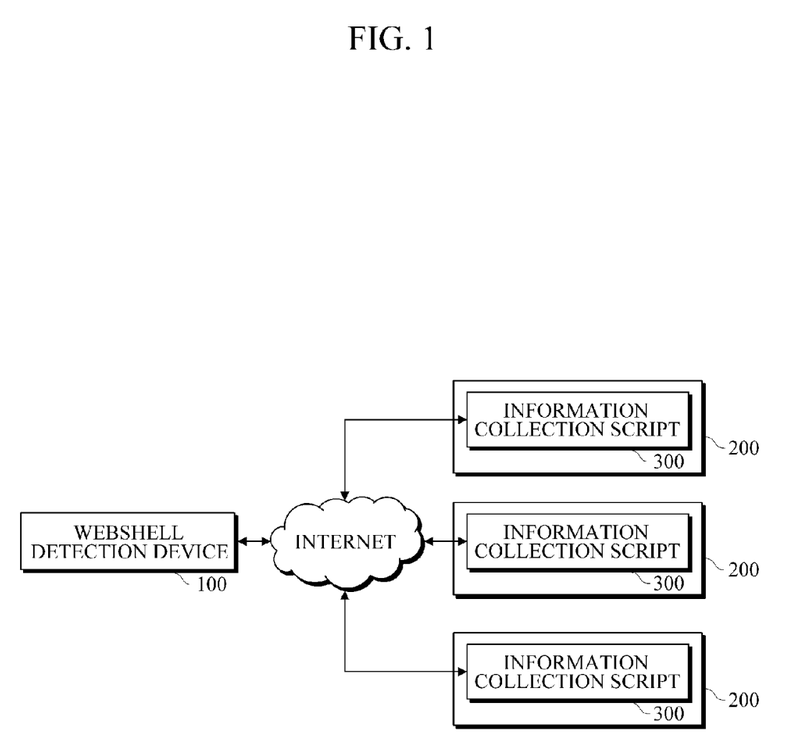
FIG. 1 is a schematic diagram illustrating a network to which a webshell detection and response system according to an embodiment of the present invention is applied.

FIG. 1 is a schematic diagram illustrating a network to which a webshell detection and response system 100 according to an embodiment of the present invention is applied. As illustrated in FIG. 1, the webshell detection and response system 100 according to an embodiment of the present invention is connected with at least one detection target server 200 via the Internet.

An information collection script 300 is inserted into a webpage home path of each detection target server 200, collects information from each detection target server 200, and transmits the collected information to the webshell detection and response system 100.

The webshell detection and response system 100 is inserted into the webpage home path of the detection target server 200 and compares current hash information of each of webpage constituent contents of the detection target server that is periodically or non-periodically collected by the information collection script 300 for collecting information from the corresponding detection target server and integrity hash information of each of the webpage constituent contents of the detection target server that is stored in advance to thereby retrieve a modulated webpage constituent content.

Next, the webshell detection and response system 100 receives a modulated webpage constituent content file from the detection target server 200 through the information collection script 300, and performs a webshell signature pattern analysis with respect to the modulated webpage constituent content file to thereby detect whether a corresponding detection target server is infected with a webshell.

Accordingly, an embodiment of the present invention detects whether the detection target server is infected with the webshell using information collected from the detection target server remotely without installing a separate webshell detection application compiled in the form of binary file in the detection target server, and therefore any conflict with other applications being processed in the detection target server is unlikely to occur, separate management personnel for webshell detection is not required in the detection target server operating side, and rapid response is made possible by a professional administrator that comprehensively manages the webshell remotely when an accident by the webshell occurs in the detection target server.

Figure 2:
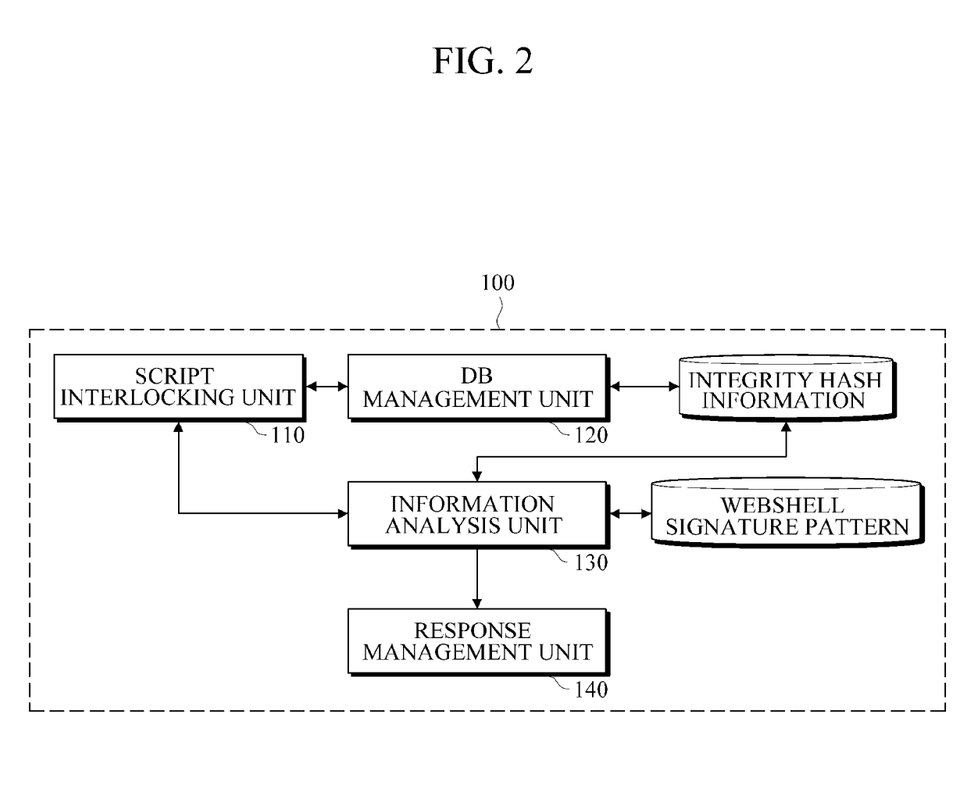
FIG. 2 is a block diagram illustrating a configuration of a webshell detection and response system according to an embodiment of the present invention.

FIG. 2 is a block diagram illustrating a configuration of a webshell detection and response system according to an embodiment of the present invention.

As illustrated in FIG. 2, the webshell detection and response system 100 according to an embodiment of the present invention may include a script interlocking unit 110, a database (DB) management unit 120, and an information analysis unit 130.

The script interlocking unit 110 is inserted into a webpage home path of the detection target server 200 and processes interlocking with the information collection script 300 for collecting information from the corresponding detection target server.

For example, the script interlocking unit 110 may periodically or non-periodically perform socket communication with the information collection script 300 so that the webshell detection and response system 100 may be implemented to be interlocked with the information collection script 300. A specific configuration of the information collection script 300 will be described later.

Meanwhile, the script interlocking unit 110 may inspect an active or inactive state of the detection target server 200 and request retrieval of a modulated webpage constituent content from the information analysis unit 130 when the corresponding detection target server 200 is in the active state.

When the detection target server is in the inactive state, the script interlocking unit 110 may store a connection failure log in the corresponding detection target server. In the connection failure log in the detection target server, identification (ID) information of the detection target server, an IP address of the detection target server, a connection attempt date and time, and the like may be recorded.

The DB management unit 120 stores integrity hash information of each of the webpage constituent contents of the detection target server 200 in the DB in advance and manages the stored integrity hash information. For example, when information is initially collected from the detection target server 200 by the information collection script 300, the DB management unit 120 may receive integrity hash information of each of the webpage constituent contents of the corresponding detection target server from the detection target server 200 and store the received information in the DB, and therefore the integrity hash information of each of the webpage constituent contents of the detection target server 200 may be registered in the webshell detection and response system 100.

The information analysis unit 130 compares current hash information of each of the webpage constituent contents of the detection target server 200 that is periodically or non-periodically collected by the information collection script 300 interlocked by the script interlocking unit 110, and integrity hash information of each of the webpage constituent contents of the detection target server that is stored by the DB management unit to thereby retrieve a modulated webpage constituent content.

In this instance, the integrity hash information and the current hash information that is periodically or non-periodically collected by the information collection script 300 may include ID information of the detection target server such as a private key of the detection target server, a hash value of the webpage constituent content file calculated using the webpage constituent content file as a seed value of a specific hash function, a depth of a path in which the webpage constituent content file is stored, a name of the webpage constituent content file, a name of the path in which the webpage constituent content file is stored, an execution authority of the webpage constituent content file, the latest update date of the webpage constituent content file, a registration date of the webpage constituent content file, and the like.

That is, the webpage constituent contents of the detection target server, in which the integrity hash information of each of the webpage constituent contents of the detection target server that is stored in advance and the current hash information of each of the webpage constituent contents of the detection target server that is periodically or non-periodically collected by the information collection script 300 are different from each other, are modulated contents, and therefore the modulated webpage constituent content may be retrieved through the information analysis unit 130.

For example, when it is determined that ID information of the detection target server included in each of the integrity hash information of the webpage constituent contents of the detection target server and the current hash information are different from each other, hash values of the webpage constituent content files are different from each other, depths of the paths in which the webpage constituent content files are stored are different from each other, names of the webpage constituent content files are different from each other, names of the paths in which the webpage constituent content files are stored are different from each other, execution authorities of the webpage constituent content files are different from each other, the latest update dates of the webpage constituent content files are different from each other, or registration dates of the webpage constituent content files are different from each other, the information analysis unit 130 may determine that the corresponding webpage constituent contents are modulated.

Meanwhile, according to another embodiment of the present invention, the information analysis unit 130 may request transmission of the modulated webpage constituent content file from the information collection script 300 so as to receive the modulated webpage constituent content file from the detection target server 200.

When the modulated webpage constituent content is retrieved, analysis concerning whether the modulated webpage constituent content is a webshell maliciously added or changed by an attacker, or the modulated webpage constituent content is reasonably changed which is not a webshell is required to be performed.

For this, when the information analysis unit 130 requests the transmission of the modulated webpage constituent content file from the information collection script 300, the information collection script 300 retrieves the modulated webpage constituent content file from the detection target server 200 and transmits the retrieved modulated webpage constituent content file to the webshell detection and response system 100, and the webshell detection and response system 100 receives the modulated webpage constituent content file through the information analysis unit 130.

Meanwhile, according to another embodiment of the present invention, the information analysis unit 130 performs a webshell signature pattern analysis with respect to the modulated webpage constituent content file received from the detection target server 200 to thereby detect whether the corresponding detection target server 200 is infected with a webshell.

For example, the webshell detection and response system 100 may store the webshell signature patterns in the DB in advance and inspect whether the modulated webpage constituent content file received from the detection target server 200 includes the webshell signature pattern stored in the DB to thereby detect whether the corresponding target server 200 is infected with the webshell.

Meanwhile, according to another embodiment of the present invention, the webshell detection and response system 100 may further include a response management unit 140.

The response management unit 140 issues a warning to an administrator of the corresponding detection target server when the detection target server is determined to be infected with the webshell by the information analysis unit 130.

For example, the response management unit 140 transmits a webshell infection report including a name of the webpage constituent content file in which the corresponding detection target server is infected with the webshell, webshell ID information, and the like using e-mail or SMS to the administrator of the detection target server, so that the fact that the corresponding target server is infected with the webshell may be notified.

Meanwhile, according to another embodiment of the present invention, when the detection target server is determined not to be infected with the webshell by the information analysis unit 130, the response management unit 140 may request update of integrity hash information of the webpage constituent content.

Thereafter, the DB management unit 120 stores, in the DB, current hash information of the modulated webpage constituent content as integrity hash information of the corresponding webpage constituent content in response to the update request of the integrity hash information of the webpage constituent content from the response management unit 140, and updates the integrity hash information of the webpage constituent content.

That is, according to the present embodiment, when the modulated webpage constituent content is not infected with the webshell but reasonably modulated, the integrity hash information of the modulated webpage constituent content is changed, and therefore the integrity hash information of the modulated webpage constituent content may be updated as new integrity hash information of the corresponding webpage constituent content.

Meanwhile, according to another embodiment of the present invention, the information collection script 300 encodes and transmits the modulated webpage constituent content file, and the information analysis unit 130 of the webshell detection and response system 100 that has received the modulated webpage constituent content file decodes the encoded and modulated webpage constituent content file to thereby analyze whether the detection target server is infected with the webshell.

Meanwhile, according to another embodiment of the present invention, the information analysis unit 130 may store a webshell detection log as a result obtained by performing the webshell signature pattern analysis with respect to the modulated webpage constituent content file. In the webshell detection log, ID information of the detection target server, an IP address of the detection target server, an analysis date, and the like may be recorded.

Meanwhile, according to another embodiment of the present invention, the script interlocking unit 110, the DB management unit 120, the information analysis unit 130, and the response management unit 140 of the webshell detection and response system 100 may be physically or logically implemented as a single server object, or each of them may be implemented as a plurality of server objects that are physically or logically distributed.

Therefore, according to the present invention, whether the detection target server is infected with the webshell is determined using information collected from the detection target server remotely without installing a separate webshell detection application compiled in the form of binary file in the detection target server, and therefore any conflict with other applications being processed in the detection target server is unlikely to occur, separate management personnel for webshell detection is not required in the detection target server operating side, and rapid response is made possible by a professional administrator that comprehensively manages the webshell remotely when an accident by the webshell occurs in the detection target server.

Figure 3:
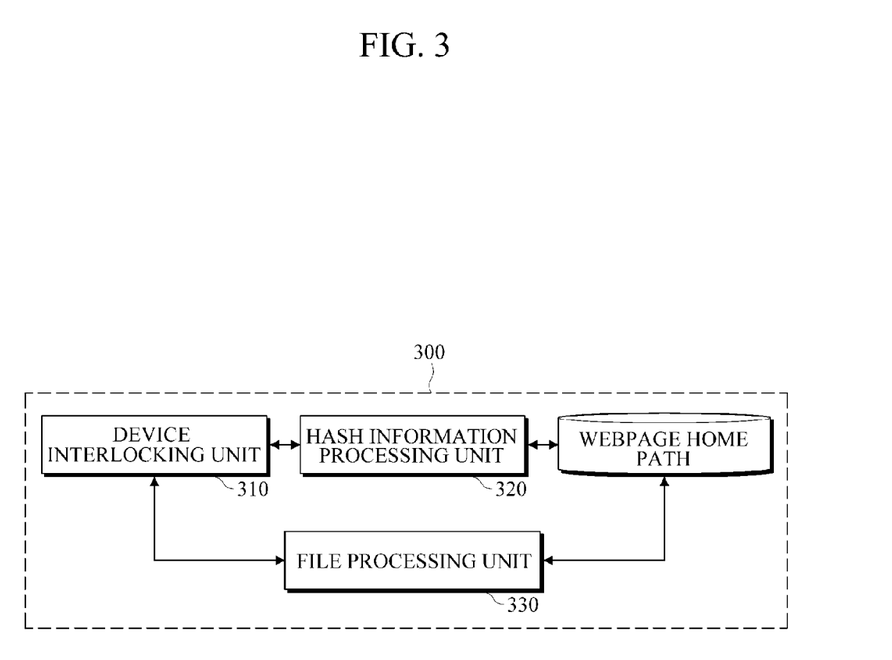
FIG. 3 is a block diagram illustrating a configuration of an information collection script that is inserted into a webpage home path of a detection target server to collect information from the detection target server.

FIG. 3 is a block diagram illustrating a configuration of an information collection script that is inserted into a webpage home path of a detection target server to collect information from the detection target server.

As illustrated in FIG. 3, the information collection script 300 includes a device interlocking unit 310, a hash information processing unit 320, and a file processing unit 330.

The device interlocking unit 310 is interlocked with the webshell detection and response system 100. For example, the device interlocking unit 310 may be implemented so as to be interlocked with the webshell detection and response system 100 by periodically or non-periodically performing socket communication with the webshell detection and response system 100 in response to the request from the webshell detection and response system 100.

The socket communication is a method that generates a socket that is a communication object located in a communication contact point of two computers connected via a network and exchanges data with each other through the socket. Here, when the other side receives signals transmitted from one side, connection is established, and then data is exchanged. That is, data may be exchanged using a TCP packet of an IP protocol in which reliability can be ensured or a UDP packet of an IP protocol in which reliability cannot be ensured.

The hash information processing unit 320 may generate current hash information about all webpage constituent content files within a webpage home path of the detection target server 200, and transmits the generated current hash information to the webshell detection and response system interlocked by the device interlocking unit.

For example, the current hash information may include ID information of the detection target server, a hash value of the webpage constituent content file, a depth of a path in which the webpage constituent content file is stored, a name of the webpage constituent content file, a name of the path in which the webpage constituent content file is stored, an execution authority of the webpage constituent content file, the latest update data of the webpage constituent content file, a registration date of the webpage constituent content file, and the like.

The hash information processing unit 320 may ascertain hash values about all webpage constituent content files within the webpage home path of the detection target server, the depths of the paths in which the webpage constituent content file is stored, the file names, the path names, the execution authorities, the latest update dates, and the registration dates, and add ID information of the corresponding detection target server to this to thereby generate current hash information about each of the webpage constituent content files of the detection target server 200.

In this instance, when the current hash information of each of the webpage constituent content files of the detection target server 200 is initially generated, the initially generated current hash information of each of the webpage constituent content files may be integrity hash information of each of the webpage constituent contents of the detection target server 200.

The file processing unit 330 transmits the modulated webpage constituent content file within the webpage home path of the detection target server 200 to the webshell detection and response system in response to the transmission request of the modulated webpage constituent content file from the webshell detection and response system interlocked by the device interlocking unit 310.

As described above, when the modulated webpage constituent content is retrieved by the webshell detection and response system 100, analysis concerning whether the modulated webpage constituent content is a webshell maliciously added or changed by an attacker, or the modulated webpage constituent content is reasonably changed is required to be performed, and the webshell detection and response system 100 requests transmission of the modulated webpage constituent content file through the information analysis unit 130.

Thereafter, the file processing unit 330 of the information collection script 300 retrieves the modulated webpage constituent content file within the webpage home path of the detection target server 200, and transmits the modulated webpage constituent content file to the webshell detection and response system 100. Next, the webshell detection and response system 100 receives the modulated webpage constituent content file through the information analysis unit 130, and perform analysis concerning whether the modulated webpage constituent content is the webshell maliciously added or changed by an attacker, or the modulated webpage constituent content is reasonably changed.

As described above, a process of detecting a webshell of the webshell detection and response system according to an embodiment of the present invention will be described with reference to FIG. 4.

Figure 4:
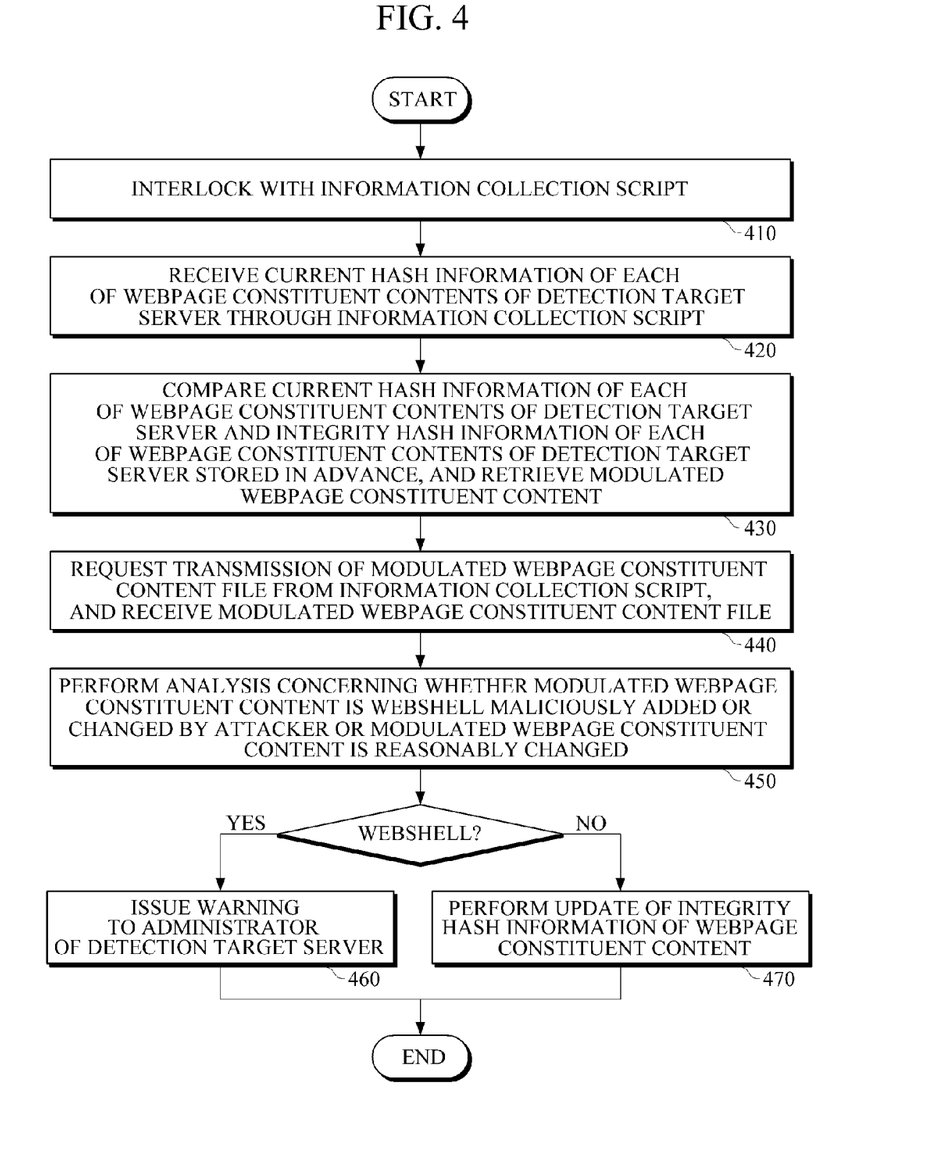
FIG. 4 is a flowchart illustrating an example of a webshell detection operation of a webshell detection and response system according to an embodiment of the present invention.

FIG. 4 is a flowchart illustrating an example of a webshell detection operation of a webshell detection and response system according to an embodiment of the present invention.

Before the description, it is assumed that the information collection script for collecting information from the corresponding detection target server is inserted into the webpage home path of the detection target server, and integrity hash information of each of the webpage constituent contents of the detection target server and the webshell signature patterns are stored in the webshell detection and response system in advance.

First, in step 410, the webshell detection and response system is interlocked with the information collection script for periodically or non-periodically collecting information from the detection target server. The interlocking between the information collection script and the webshell detection and response system has been described above, and thus repeated description thereof will be omitted.

When the webshell detection and response system and the information collection script are interlocked in step 410, the webshell detection and response system receives current hash information of each of the webpage constituent contents of the detection target server through the information collection script in step 420.

The creation and transmission of the current hash information of each of the webpage constituent contents of the detection target server have been described above, and thus repeated description thereof will be omitted.

When the current hash information of each of the webpage constituent contents of the detection target server is received in step 420, the webshell detection and response system compares the received current hash information of each of the webpage constituent contents of the detection target server and integrity hash information of each of the webpage constituent contents of the detection target server that is stored in advance to thereby retrieve a modulated webpage constituent content in step 430. The retrieval of the modulated webpage constituent content has been described above, and thus repeated description thereof will be omitted.

When the modulated webpage constituent content file is retrieved in step 430, the webshell detection and response system requests transmission of the modulated webpage constituent content file from the information collection script in step 440 and receives the requested modulated webpage constituent content file.

The information collection script retrieves the modulated webpage constituent content file within the webpage home path of the detection target server in response to the transmission request of the modulated webpage constituent content file, and transmits the modulated webpage constituent content file to the webshell detection and response system, and the webshell detection and response system receives the transmitted modulated webpage constituent content file.

The webshell detection and response system that has received the modulated webpage constituent content file performs analysis concerning whether the modulated webpage constituent content is a webshell maliciously added or changed by an attacker, or the modulated webpage constituent content is reasonably changed in step 450.

In this instance, by determining whether the modulated webpage constituent content file includes the webshell signature patterns stored in advance, whether the modulated webpage constituent content is the webshell maliciously added or changed by an attacker, or whether the modulated webpage constituent content is reasonably changed may be determined.

When the detection target server is determined to be infected with the webshell based on the determination result of step 450, the webshell detection and response system issues a warning to an administrator of the corresponding detection target server in step 460. The issuing of the warning when the detection target server is infected with the webshell has been described above, and thus repeated description thereof will be omitted.

Meanwhile, when the detection target server is determined not to be infected with the webshell based on the determination result of step 450, the webshell detection and response system performs update of integrity hash information of the webpage constituent content. The update of the integrity hash information of the webpage constituent content has been described above, and thus repeated description thereof will be omitted.

As described above, according to the embodiments of the present invention, the above object of the present invention can be achieved because whether the detection target server is infected with the webshell is determined using information collected from the detection target server remotely without installing a separate webshell detection application compiled in the form of binary file in the detection target server, and therefore any conflict with other applications being processed in the detection target server is unlikely to occur, separate management personnel for webshell detection is not required in the detection target server operating side, and rapid response is made possible by a professional administrator that comprehensively manages the webshell remotely when an accident by the webshell occurs in the detection target server.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A webshell detection and response system, comprises:
   a script interlocking unit that processes interlocking with an information collection script that is inserted into a webpage home path of a detection target server to collect information from the detection target server;
   a database (DB) management unit that stores, in a DB, integrity hash information for verifying integrity of each of webpage constituent contents of the detection target server in advance and manages the stored hash information; and
   an information analysis unit that compares current hash information of each of the webpage constituent contents of the detection target server periodically or non-periodically collected by the information collection script interlocked by the script interlocking unit and the integrity hash information of each of the webpage constituent contents of the detection target server that is stored by the DB management unit to thereby retrieve a modulated webpage constituent content,
   wherein the script interlocking unit, the database (DB) management unit, the information analysis unit, or any combination thereof is implemented by a processor.

2. The webshell detection and response system of claim 1, wherein the information analysis unit requests transmission of a modulated webpage constituent content file from the information collection script, and receives the modulated webpage constituent content file from the detection target server.

3. The webshell detection and response system of claim 2, wherein the information analysis unit performs webshell signature pattern analysis with respect to the modulated webpage constituent content file received from the detection target server to thereby detect whether the detection target server is infected with a webshell.

4. The webshell detection and response system of claim 3, further comprising
   a response management unit that issues a warning to an administrator of the detection target server when the detection target server is determined to be infected with the webshell by the information analysis unit.

5. The webshell detection and response system of claim 4, wherein the response management unit requests update of the integrity hash information of the webpage constituent contents when the detection target server is determined not to be infected with the webshell by the information analysis unit.

6. The webshell detection and response system of claim 5, wherein the DB management unit stores current hash information of the modulated webpage constituent contents as the integrity hash information of the corresponding webpage constituent contents in the DB in response to the update request of the integrity hash information of the webpage constituent contents from the response management unit to thereby update the integrity hash information of the webpage constituent contents.

7. The webshell detection and response system of claim 1, wherein the script interlocking unit inspects an active or inactive state of the detection target server and requests retrieval of the modulated webpage constituent content from the information analysis unit when the corresponding detection target server is in the active state.

8. The webshell detection and response system of claim 7, wherein the script interlocking unit stores a connection failure log in the corresponding detection target server when the detection target server is in the inactive state.

9. The webshell detection and response system of claim 1, wherein the hash information includes detection target server identification (ID) information, a hash value of the webpage constituent content file, a depth of a path in which the webpage constituent content file is stored, a webpage constituent content file name, a path name in which the webpage constituent content file is stored, an execution authority of the webpage constituent content file, the latest update date of the webpage constituent content file, a registration date of the webpage constituent content file, and the like.

10. The webshell detection and response system of claim 1, wherein the information collection script comprises:
    a device interlocking unit that is interlocked with the webshell detection and response system;
    a hash information processing unit that generates current hash information about all of the webpage constituent content files within the webpage home path of the detection target server, and transmits the generated current hash information to the webshell detection and response system interlocked by the device interlocking unit; and
    a file processing unit that transmits the modulated webpage constituent content file within the webpage home path of the detection target server to the webshell detection and response system in response to the transmission request of the modulated webpage constituent content file from the webshell detection and response system interlocked by the device interlocking unit,
    wherein the device interlocking unit, the hash information processing unit, the file processing unit, or any combination thereof is implemented by a processor.

\* \* \* \* \*